(No Model.)

T. L. BROOKS.
FEEDING DEVICE FOR HORSES.

No. 289,214. Patented Nov. 27, 1883.

WITNESSES
Villette Anderson.
John T. Morrow

INVENTOR
Theodore L. Brooks
by Anderson & Smith
ATTORNEYS

UNITED STATES PATENT OFFICE.

THEODORE L. BROOKS, OF PORT BYRON, NEW YORK.

FEEDING DEVICE FOR HORSES.

SPECIFICATION forming part of Letters Patent No. 289,214, dated November 27, 1883.

Application filed October 10, 1883. (No model.)

*To all whom it may concern:*

Be it known that I, THEODORE L. BROOKS, a citizen of the United States, residing at Port Byron, in the county of Cayuga and State of New York, have invented certain new and useful Improvements in Horse-Feeding Devices; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
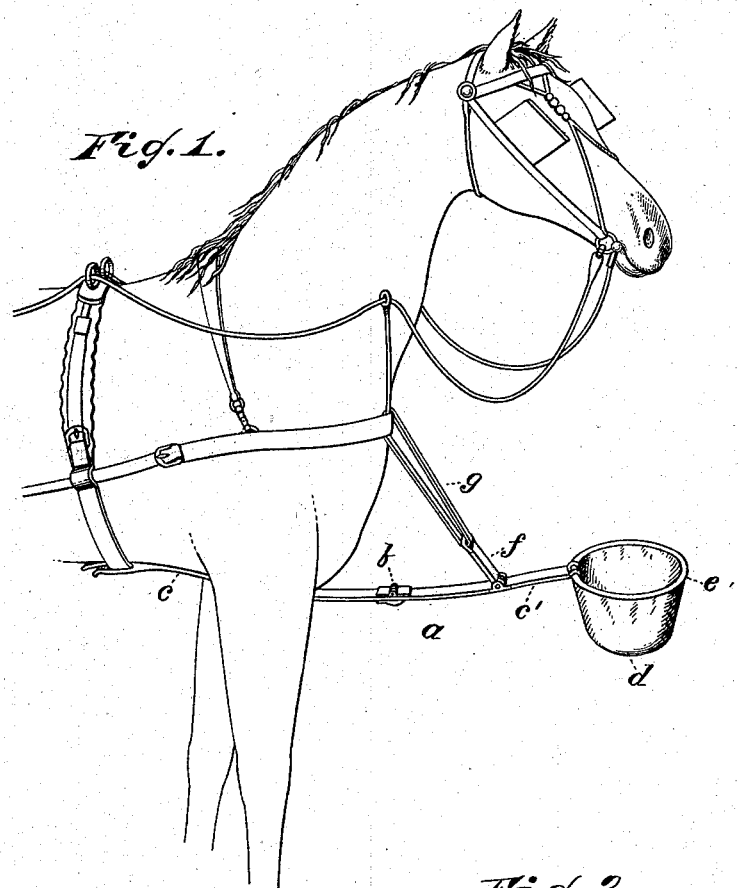
Figure 2:
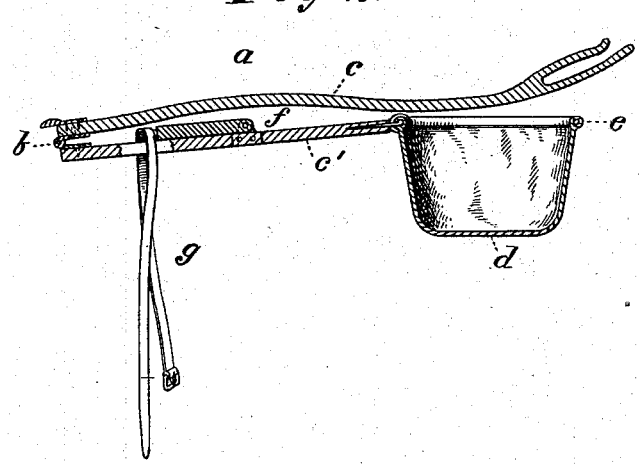

Figure 1 of the drawings is a representation of this invention, and is a perspective view showing its position on the horse. Fig. 2 is a longitudinal section.

This invention has relation to adjustable devices for feeding horses while in the harness; and it consists in the construction and novel arrangement of devices, as will be hereinafter fully described, and particularly pointed out in the claim appended.

Referring by letter to the accompanying drawings, $a$ designates a folding bar of suitable material, $b$ designating the hinge. The section $c$ of the bar is bifurcated at its outer end to receive the belly-band of the harness when the bar is passed back between the fore legs of the horse. The section $c'$ is provided at its outer end with the feed-pan $d$, which is of canvas, and is provided with a wire rim, $e$, to keep it distended.

$f$ designates a jointed stud, secured to the section $c'$ of the folding bar, to prevent the feed-pan from being overturned while the horse is feeding; and $g$ designates a strap connecting the jointed stud $f$ to the collar to hold the feed-pan in proper position before the horse while feeding.

The device can be readily attached and detached, and when not in use may be folded and placed in the vehicle to which the horse is attached. It is cheap, simple, useful, and convenient, and is superior to the feeding devices now in use, as the folding bar furnishes a bearing for the feed-pan, and the feed is not liable to be spilled and wasted. Besides, the horse can lift his head free from the feed-pan, and is not annoyed by having the nose-bag attached to his head.

Having thus fully described my invention, what I claim as new, and desire to secure by Letters Patent, is—

In a device for feeding horses while in harness, the combination, with the folding bar bifurcated at the end of one of its sections, and provided with the wire-rimmed canvas feed-pan at the end of the other section, of the jointed stud connected to the pan-section of the folding bar, and the securing-strap for attaching it to the collar, substantially as specified.

In testimony whereof I affix my signature in presence of two witnesses.

THEODORE L. BROOKS.

Witnesses:
  S. B. YATES,
  L. B. BURRITT.